Nov. 23, 1926.
W. M. CUTLER
1,608,464
CHUCK
Filed March 23, 1923   2 Sheets-Sheet 1
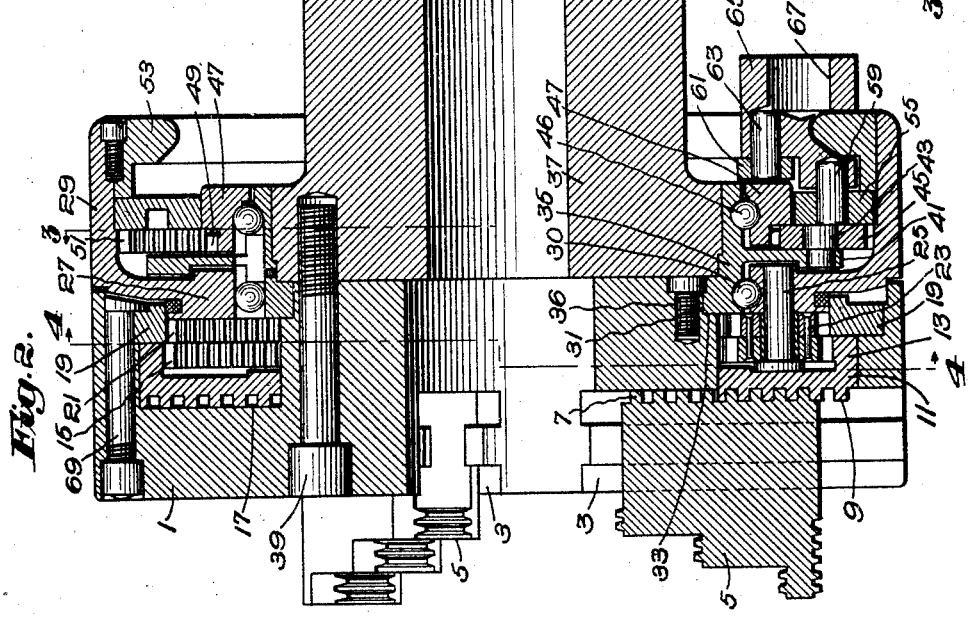
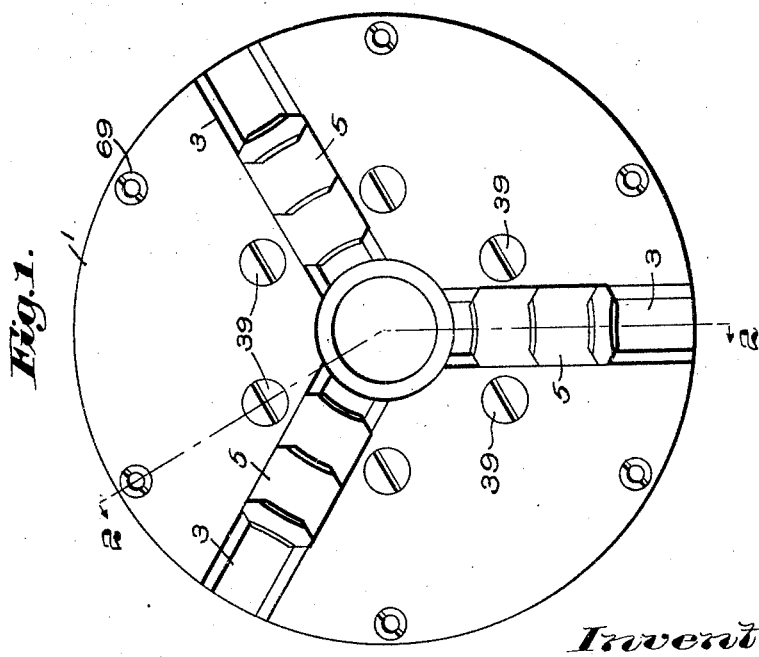
Inventor:
Wallace M. Cutler:
by Emery Booth Janney & Varney
Attys Nov. 23, 1926. 1,608,464
W. M. CUTLER
CHUCK
Filed March 23, 1923 2 Sheets-Sheet 2

Inventor:
Wallace M. Cutler
by Emery Booth Janney Varney Attys

UNITED STATES PATENT OFFICE.

WALLACE M. CUTLER, OF WINDSOR LOCKS, CONNECTICUT, ASSIGNOR TO THE E. HORTON & SON COMPANY, OF WINDSOR LOCKS, CONNECTICUT, A CORPORATION OF CONNECTICUT.

CHUCK.

Application filed March 23, 1923. Serial No. 627,134.

My invention which relates to chucks and has among its objects a superior construction for operating the jaws while the chuck is rotating, will be best understood from the following description and accompanying drawings of one specific embodiment of my invention selected for illustrative purposes, while the scope of my invention will be more particularly pointed out in the appended claims.

In the drawings:—

Fig. 1 shows an elevation of the face of a chuck constructed according to my invention;

Fig. 2 is a section on the line 2—2 of Fig. 1; and

Figure 4:
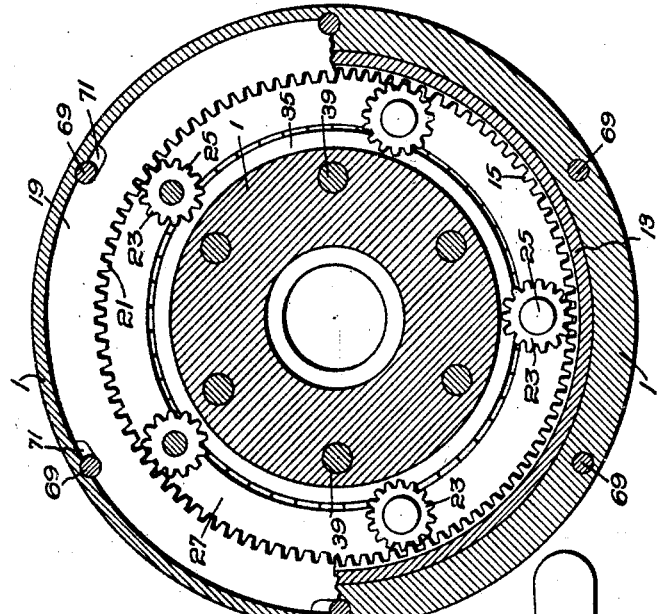
Figure 3:
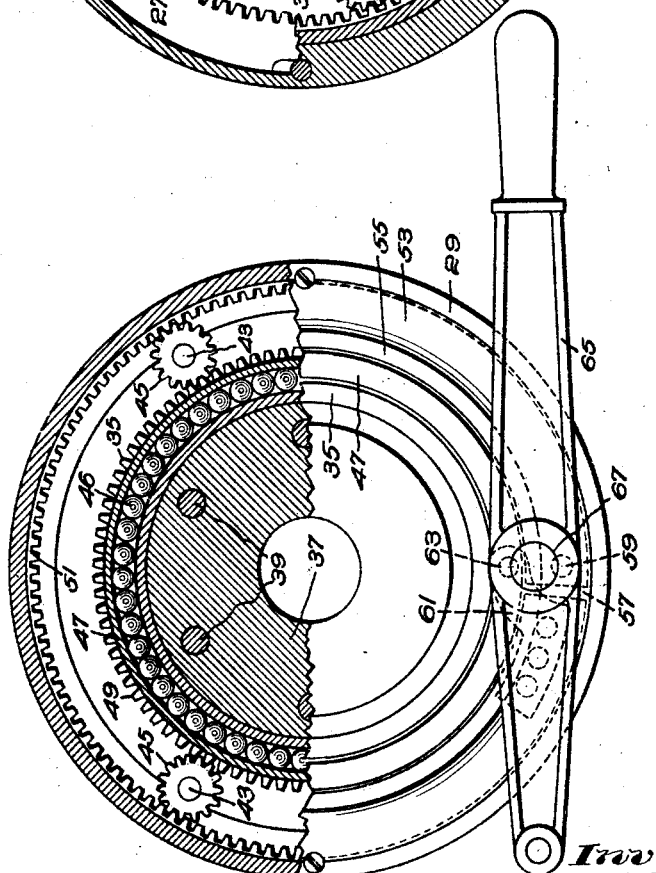

Figs. 3 and 4 respectively are sections on the lines 3—3 and 4—4 of Fig. 2.

In this application I do not claim broadly the control of the differential gear mechanism by a planetary mechanism, since this is claimed in my copending application, Serial No. 483,260. Further I do not herein claim broadly the differential gearing as herein applied to the chuck, since this is claimed in my copending applications Serial Nos. 483,258 and 627,133.

Referring to the drawings and to the preferred embodiment of my invention the chuck has a body 1 provided with radially disposed slots 3 the sides of which are formed to provide guideways for the radially movable jaws 5, the jaws on their rearward sides being provided with teeth 7 which engage scroll teeth 9 on a scroll wheel 11. As will be understood by those skilled in the art rotation of the scroll wheel will move the jaws to release or grip the work as desired.

For rotating the scroll wheel I provide differential mechanism which when rotated relatively to the body of the chuck in one direction is effective to rotate the scroll wheel in one direction, and when rotated in the opposite direction relatively to the body of the chuck is effective to rotate the scroll wheel in the opposite direction. The differential mechanism when the chuck is rotating may be operated directly for rotating the scroll wheel in one direction or may be rotated by planetary mechanism for rotating the scroll wheel in the opposite direction. I also provide a hand wheel for operating the differential mechanism in opposite directions.

Providing the differential mechanism I have shown the scroll wheel formed with an annular flange 13 which flange has internal gear teeth 15. The scroll wheel is mounted in an annular recess 17 formed on the rearward side of the body and is retained in this recess by means of a ring 19 the ring having the internal gear teeth 21. With the gear teeth 15 and 21 mesh differential pinions 23 which are mounted on the pins 25 carried by the internal annular flange 27 of the hand wheel or ring 29 which is mounted for rotation on the anti-friction bearing 30. The gear teeth 15 have slightly greater pitch diameter than the gear teeth 21, and consequently when the hand wheel is rotated relatively to the body of the chuck the scroll wheel will likewise be rotated relatively to the body of the chuck and at a speed relative to the hand wheel dependent upon the difference in pitch diameters of the gear teeth 15 and 21.

The rearward side of the body of the chuck is exteriorly reduced in diameter at 31 to provide a shoulder 33. Fitting the reduced diameter portion 31 and abutting the shoulder is a sleeve 35 which is secured to the body by one or more screws 36. The sleeve extends rearwardly and surrounds the part 37 to which the chuck is attached, this part 37 being carried for example by the lathe spindle and being secured to the body of the chuck by means of the bolts 39.

Providing the planetary mechanism I form the sleeve or ring 35 with the annular external flange 41, the flange carrying pins 43 on which are mounted planetary pinions 45. At the rearward end of the sleeve 35 I mount for rotation on the anti-friction bearing 46 a ring 47 which is provided with external gear teeth 49 meshing with planetary pinions, and on the hand wheel 29 I provide internal gear teeth 51 which also mesh with the planetary pinions. By this construction it will be noted that if the chuck is rotating and the ring 47 is caused to stand stationary or to rotate at a slower speed than the chuck the planetary pinions will cause the hand wheel 29 to rotate at a speed greater than that of the chuck, and consequently by causing this relative motion between the chuck and the ring 47 I am able to rotate the scroll wheel while the chuck is rotating in the opposite direction to that in which it rotates when the hand wheel is caused to stand stationary or rotate at a speed less than that of the chuck.

It will also be understood that by rotating the ring 29 by hand in opposite directions when the chuck is stationary the scroll wheel may be rotated in an opposite direction if desired. Conveniently the hand wheel 29 is provided with a grip portion 53 in the form of an internal flange secured to the rearward end of the hand wheel.

For causing the ring 47 and hand wheel 29 to come to rest when the chuck is rotated or to cause them to rotate at a less speed than the chuck I may provide any suitable brake mechanism. Herein I have shown a ring 55 positioned in the annular space between the ring 47 and the hand wheel, the ring being split as indicated at 57 in Fig. 3. One end of the ring adjacent the split 57 carries a pin 59, while the opposite end of the ring carries a bracket 61 one end of which as clearly shown by Figs. 2 and 3 carries a pin 63. The pins 59 and 63 pivotally engage the hand lever 65, the lever being pivotally supported at 67 to a fixed part of the lathe. It will be noticed that if the lever is moved counterclockwise as viewed in Fig. 3 the ring 55 will be expanded, while if the lever is moved clockwise the ring will be contracted. When expanded the ring engages the internal annular surface of the hand wheel 29, while when the ring is contracted it engages the external annular surface of the ring 47.

In order to exert a powerful force for closing the jaws on the work or releasing them therefrom I provide lost motion in the train of gearing operating the scroll wheel. Referring particularly to Figs. 2 and 4 the ring 19 hereinbefore mentioned is secured to the body of the chuck by means of bolts 69 which pass through notches 71 on the exterior of the ring. By this construction I am enabled by taking up the lost motion suddenly to exert a "hammer blow" on the jaws.

Although I have described for purposes of illustration one specific embodiment of my invention it is to be understood that within the scope of my invention wide deviations may be made therefrom without departing from the spirit of my invention.

Claims:

1. A chuck comprising, in combination, a body, jaws, a jaw operating part mounted for rotation relatively to said body, a pair of rings rotatable relatively to said body, a detachable bearing member for said rings non-rotatably carried by said body, a planetary pinion having a pivot rotating with said body and meshing with said rings, one of said rings carrying a differential pinion meshing with said body and said jaw operating part, and an expansible and contractible ring rotatable relatively to said body and positioned between the rings of said pair, and means for expanding and contracting said ring for causing it selectively to engage either ring of said pair.

2. A chuck comprising, in combination, a body, jaws, a jaw operating part mounted for rotation relatively to said body, differential means for rotating said jaw operating part, said means including a ring rotatable relatively to said body and having internal gear teeth, a pinion having a pivot rotating with said body, said pinion meshing with said internal gear teeth, a second ring rotatable relatively to said body and having external gear teeth meshing with said pinion, a separately formed member non-rotatably carried by said body and having bearings for said rings, and an expansible and contractible ring between the two rings first mentioned, and means for expanding and contracting said ring for causing it selectively to engage the two other rings.

3. A chuck comprising, in combination, a body, jaws, a jaw operating part mounted for rotation relatively to said body, a part to which said body is secured, said body having a sleeve portion surrounding said last mentioned part, a ring rotatable relatively to said body and surrounding said sleeve portion, said ring having an internal flange mounted upon said sleeve portion and carrying a differential pinion meshing with said body and said jaw operating part, a second ring mounted upon said sleeve portion for rotation, each of said rings carrying a gear, a pinion carried by said sleeve portion and meshing with the gears carried by rings, and means for selectively gripping either of said rings to prevent rotation thereof with said body.

4. A chuck comprising, in combination, a body, jaws, a jaw operating part mounted for rotation relatively to said body, a part to which said body is secured, a pair of concentric rings surrounding said part, one of which rings is non-rotatively carried by said body and the other rotatively carried, differential means for rotating said jaw operating part operated by the last mentioned of said rings, and planetary means carried by the other of said rings for causing rotation of said last mentioned ring relatively to said body.

5. A chuck having in combination, a body, jaws, a jaw operating part mounted for rotation relatively to said body, means for actuating said jaw operating part including differential gearing having a pair of gears one stationary relatively to the other when the jaws are moving relatively to said body and a common pinion meshing with both gears, one of said gears having a lost motion connection with the part opposing its rotation, a part rotatable relatively to said body on which said pinion is mounted, and means including brake mechanism controlled by the operator for rotating said last mentioned part either faster or slower than said body when said chuck is in rotation.

6. A chuck having in combination, a body, jaws, a jaw operating part mounted for rotation relatively to said body, means for actuating said jaw operating part including differential gearing having a pair of gears one stationary relatively to the other when the jaws are moving relatively to said body and a common pinion meshing with both gears, one of said gears having a lost motion connection with the part opposing its rotation, a part rotatable relatively to said body on which said pinion is mounted, means including planetary gearing controlled by the operator for rotating said part faster than said chuck when said chuck is in rotation.

7. A chuck comprising, in combination, a body, jaws, a jaw operating part mounted for rotation relatively to said body, differential means for rotating said part, said means including a pinion mounted for revolution relatively to said body and meshing with two annular series of gear teeth respectively carried by said body and jaw operating part, means permitting a limited rotative movement of one of said annular series of gear teeth relatively to the part carrying it, and planetary means for revolving said pinion faster than said chuck when said chuck is rotating.

8. A chuck comprising, in combination, a body, jaws, a jaw operating part, differential gearing for operating said jaw operating part, said differential gearing comprising a gear having a lost motion connection to the part opposing its rotation, and planetary means actuated by rotation of said chuck for actuating said differential gearing for moving said jaws.

9. A chuck comprising, in combination, a body, jaws, a jaw operating part, differential gearing for operating said jaw operating part, said differential gearing comprising a gear having a lost motion connection to the part opposing its rotation, and brake controlled planetary means actuated by rotation of said chuck for actuating said differential gearing for moving said jaws.

10. A chuck comprising, in combination, a body, jaws, a jaw operating part, differential gearing for operating said jaw operating part, said differential gearing comprising a gear having a lost motion connection to the part opposing its rotation, brake controlled planetary means for actuating said differential gearing for moving said jaws in one direction, and other means for actuating said differential gearing for moving said jaws in the opposite direction.

11. A chuck having in combination, a body, jaws, a jaw operating part, a member mounted on said body for relative rotation thereto, reduction gearing comprising a train of gears permanently in mesh for transmitting the effort of said member to said jaw operating part, a lost motion connection other than back lash in said train of gears for permitting substantial rotation of said member in either direction without actuating said jaws, an annular longitudinally disposed flange carried by said member, and planetary means and brake mechanism housed by said flange for rotating said member in either of opposite directions relatively to said body.

12. A chuck having in combination, a body, jaws, jaw operating means including an internal gear mounted in a rearwardly opening recess in said body, a ring having internal gear teeth mounted in said recess and retaining said internal gear in said recess, means securing said ring to said body and permitting limited rotative motion of said ring relatively to said body, a hand wheel closing said recess and mounted on said body for rotation relatively to said body, a rearwardly projecting flange on said hand wheel, and brake mechanism and planetary gearing housed by said flange for rotating said hand wheel in either of opposite directions relatively to said body.

13. A chuck comprising, in combination, a body, jaws, a jaw operating part mounted for rotation relatively to said body, differential means for rotating said jaw operating part, a part to which said body is attached, said body having a sleeve surrounding said last mentioned part, a ring mounted upon said sleeve for rotation relatively thereto, and planetary means actuated by said ring for operating said differential means.

14. A chuck comprising, in combination, a body, jaws, a jaw operating part mounted for rotation relatively to said body, differential means for rotating said jaw operating part, a part to which said body is attached, said body having a sleeve surrounding said last mentioned part, a ring mounted upon said sleeve for rotation relatively thereto, planetary means actuated by said ring for operating said differential means, and braking means causing said ring to actuate said planetary means.

15. A chuck comprising, in combination, a body, jaws, a jaw operating part mounted for rotation relatively to said body, differential means for rotating said jaw operating part, a part to which said body is attached, said body having a sleeve surrounding said last mentioned part, a ring mounted upon said sleeve for rotation relatively thereto, planetary means actuated by said ring for operating said differential means, and braking means for selectively causing said ring to actuate said planetary means or causing said differential means to be operated independently of said planetary means.

In testimony whereof I have signed my name to this specification.

WALLACE M. CUTLER.